United States Patent
Chavis et al.

(10) Patent No.: US 11,449,372 B1
(45) Date of Patent: Sep. 20, 2022

(54) SYSTEM FOR ENFORCING USE OF SCHEMAS AND INTERFACES

(71) Applicant: AMAZON TECHNOLOGIES, INC., Seattle, WA (US)

(72) Inventors: Evan Alexander Chavis, Ann Arbor, MI (US); Daniel Morgan Harris, Grosse Pointe Farms, MI (US); Michael Linington, Ypsilanti, MI (US); Tim Downs, Plymouth, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/456,572

(22) Filed: Jun. 28, 2019

(51) Int. Cl.
  *G06F 3/00* (2006.01)
  *G06F 9/54* (2006.01)
  *G06F 16/955* (2019.01)
  *G06F 16/21* (2019.01)

(52) U.S. Cl.
  CPC ............ *G06F 9/547* (2013.01); *G06F 16/212* (2019.01); *G06F 16/955* (2019.01)

(58) Field of Classification Search
  CPC ........... G06F 9/54; G06F 9/547; G06F 16/212
  USPC ........................................................ 719/310
  See application file for complete search history.

(56) References Cited

U.S. PATENT DOCUMENTS

| | | | | |
|---|---|---|---|---|
| 7,665,127 B1 * | 2/2010 | Rao | ...................... | H04L 63/0815 726/9 |
| 9,699,167 B1 * | 7/2017 | Tovino | ...................... | H04L 63/10 |
| 10,412,217 B1 * | 9/2019 | Stephens | ...................... | H04M 3/38 |
| 2003/0182280 A1 * | 9/2003 | Cormack | ...................... | G06F 9/50 |
| 2007/0239441 A1 * | 10/2007 | Navratil | ...................... | G10L 17/20 704/225 |
| 2009/0307201 A1 * | 12/2009 | Dunning | ...................... | G06F 16/683 |
| 2011/0161343 A1 * | 6/2011 | Schimpf | ...................... | G06F 16/2428 707/769 |
| 2014/0208393 A1 * | 7/2014 | Yasukawa | ...................... | H04L 67/14 726/4 |

(Continued)

OTHER PUBLICATIONS

Thanh Nguyen, Complementing Global and Local Contexts in Representing API Descriptions to Improve API Retrieval Tasks. (Year: 2018).*

(Continued)

*Primary Examiner* — Lechi Truong
(74) *Attorney, Agent, or Firm* — Lindauer Law, PLLC

(57) ABSTRACT

To ensure that clients use the most current versions of schemas and provide requests to particular Application Programming Interfaces (APIs) in a desired order, identifiers associated with resources may be used to determine client requests that comply with desired schemas and API interactions. When a request to access a first resource is received, a link to a second resource and an identifier may be provided. When a request to access the second resource is received, if the identifier associated with the request is absent or does not match the expected identifier, the request may be denied without using computational resources to process the request. Identifiers may include strings included in Uniform Resource Identifiers (URIs) or query parameters. Identifiers may also include modified field names, arrangements, or other characteristics of schemas associated with the requests. Schemas of received requests may be converted to standard schemas to prepare a response.

20 Claims, 8 Drawing Sheets

(56) References Cited

U.S. PATENT DOCUMENTS

2015/0161282 A1* 6/2015 Low .................... G06F 16/9566
709/203
2016/0357537 A1* 12/2016 Falkenburg ............. H04L 67/06
2017/0346875 A1* 11/2017 Wells .................... G06F 9/5033

OTHER PUBLICATIONS

Tiziana Catarci, Visual Query Systems for Databases: A Survey. (Year: 1996).*
H. V. Jagadish1, Timber: A native XML database. (Year: 2002).*
Craig Sayers, The case for generating URIs by hashing RDF content. (Year: 2002).*
Maria Butrico, Enterprise Data Access from Mobile Computers: An End-to-end Story (Year: 2000).*

* cited by examiner

SYSTEM FOR ENFORCING USE OF SCHEMAS AND INTERFACES

BACKGROUND

Developers of interfaces and other types of services may access various resources using Application Programming Interfaces (APIs). However, in some cases, a developer may fail to use the most current version of a schema associated with a resource or API, or may fail to receive the most current version of a link to a resource from an API. If a resource is later changed or deprecated, a service may no longer function, or it may be necessary to continue supporting deprecated versions of resources and interfaces to prevent negative user experiences.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
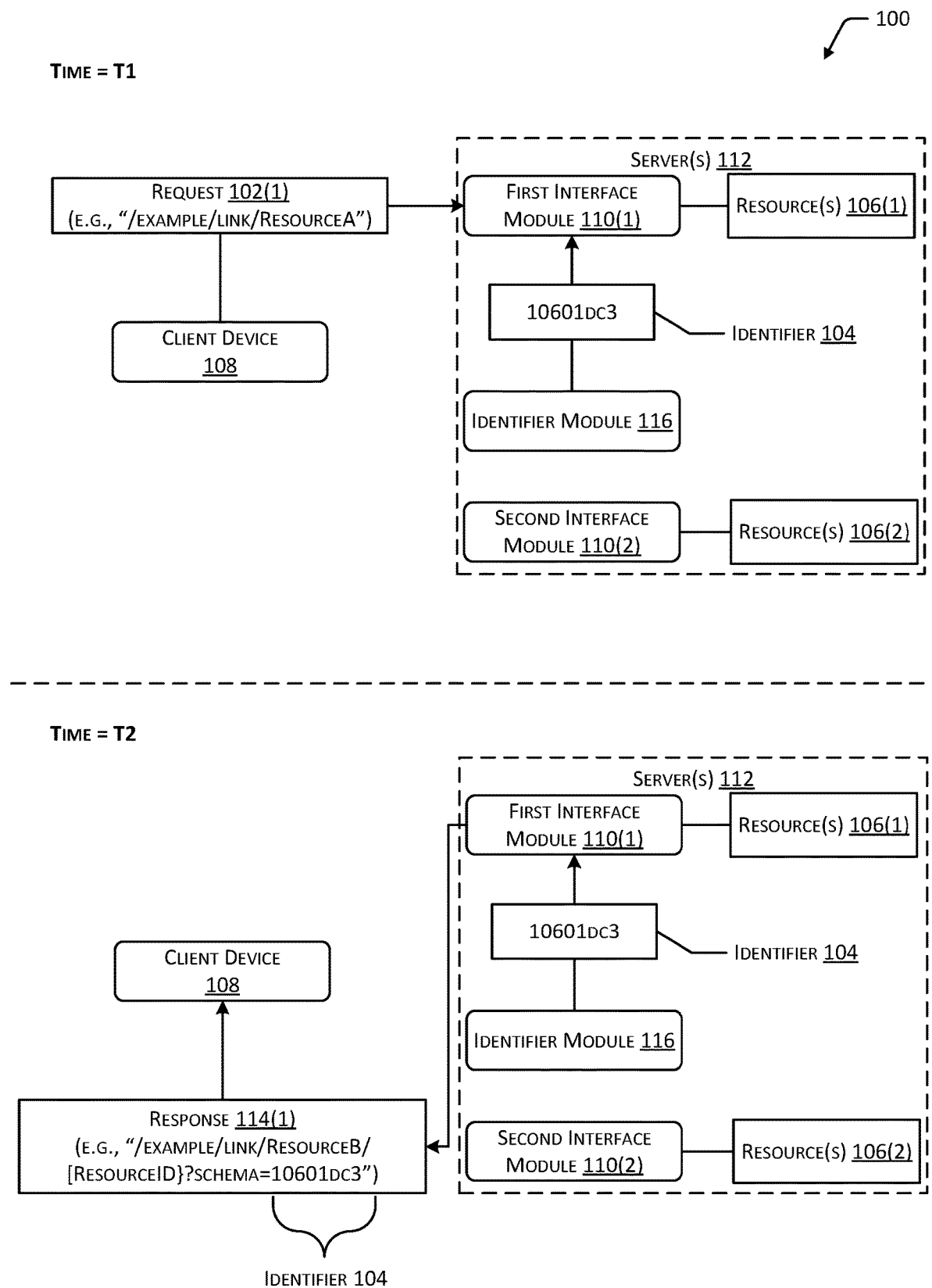
FIGS. 1A and 1B depict an implementation of a system that may be used to determine requests that have been provided in proper or improper manners based on identifiers associated with APIs or resources.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Various types of interfaces and other web services may be created using the Representational State Transfer (REST) architectural style, which may allow components of a system to be managed and updated while the system remains active. For example, a RESTful API, also referred to as a RESTful web service, may be configured to use Hypertext Transfer Protocol (HTTP) requests to modify data, such as through use of HTTP "get", "put", "post", and "delete" commands. Continuing the example, a user who wishes to access a resource may provide a request to an API, and in response to the request, data indicative of the resource may be provided in the form of a response. Some types of interfaces, such as self-describing interfaces, may include links or other types of indicators that indicate other resources or interfaces. For example, when a first request is provided to a first interface, the response to the request may include an indicator that references a second interface or resource. The client that provided the first request may then provide a subsequent request to the second interface.

As one example of such a process, a seller that provides items for purchase in an online store may access an interface to send messages to a group of buyers that have purchased particular items. To do so, the seller may provide a request to a first interface to receive a schema that indicates the particular fields for which the seller must provide values to generate a message. The response from the first interface may also include a link or other type of indicator that indicates a second interface. The seller may then provide a request to the second interface that includes the values indicated in the schema. In response to the request, the second interface may prepare a message based on the information in the request. In some cases, after a seller has created a message in this manner, on subsequent occasions when the seller wishes to create a message, the seller may attempt to provide a request directly to the second interface that includes the information indicated in the schema, without providing a request to the first interface. For example, the seller may code a service to provide requests that include specific information indicated in the schema to the second interface, without providing requests to the first interface to determine the schema. If the creator of the interface changes the schema, such as to improve the buyer experience by adding or removing fields or changing the arrangement of the fields, future requests provided by the seller to the second interface will not comply with the modified schema. In such a case, attempts to generate a message by the seller may fail due to missing information or information that does not correspond to the modified schema. In other cases, attempts to generate a message may result in a lesser experience for buyers that receive the message due to information that is absent or presented differently. In still other cases, rather than permitting attempts to generate a message to fail, the creators of the interface may choose to maintain previous versions of the interface, which may consume both human and computational resources while contravening the intent of the creators to provide an improved user experience for buyers.

Described in this disclosure are techniques for ensuring that services and other types of applications are configured to access and use current versions of schemas and provide requests to APIs in a desired order, rather attempting to access an interface in an improper order or providing the information associated with a previously-obtained version of a schema. For example, techniques described in this disclosure may be used to enforce the use of a desired call pattern. Continuing the example, a particular call pattern for APIs may be enforced to optimize performance and reduce computational costs. A first request to access a first resource may be received at a first API. The first resource may include a link or other type of resource indicator that indicates a second resource. When the first request is received, an identifier may be generated and associated with the second resource. The first API may provide a response that includes the indicator for the second resource and the identifier. Subsequently, a second request to access the second resource may be received at a second API. If the request includes the identifier, a response may be generated. If the request does not include the identifier or includes an incorrect identifier, the request may be denied without consuming computational resources attempting to process the request, such as by accessing the second resource.

In some implementations, the identifier associated with the second resource may take the form of a nonce. For example, an alphanumeric string or other type of identifier may be embedded within a Uniform Resource Identifier (URI), query parameter, header, link, or other element associated with a resource. If the identifier received in the subsequent request matches the identifier embedded in the resource element, or in some cases, at least partially matches the identifier within a threshold tolerance, a response indicative of the second resource may be provided to the source of the request. In some cases, the identifier may expire based on temporal factors. For example, the identifier may include a timestamp or a string that is determined based on the timestamp. The timestamp may indicate a first time at which the identifier was generated. When a request that includes the identifier is received, a current time may be determined. If the difference between the current time and the first time exceeds a threshold interval of time, the request that includes the identifier may be denied. Alternatively, if the difference between the current time and the first time is less than the threshold interval of time, a response may be generated. In other implementations, an identifier may expire after use. For example, when the identifier is generated, the identifier may be stored in a data structure associated with valid identifiers. When the second request that includes the identifier is received, correspondence between the valid identifiers of the data structure and the identifier in the request may be determined, and a response may be generated. After receiving the second request, the identifier may be removed from the data structure. If a subsequent request that includes the identifier is received, the subsequent request may be denied.

In other implementations, the identifier may take the form of one or more characteristics of a schema. For example, an original canonical schema may be used to generate a temporary schema having one or more field names or structural characteristics that differ from the canonical schema. When a request is received at a first API, the temporary schema may be accessed and used to generate a form or other type of user interface for receiving values from a user. If the user or service provides values to the form generated using the temporary schema, correspondence between the fields or other characteristics of the input from the user or service and the temporary schema may be determined when the values are received at a second API, and a response may be generated. In some cases, a portion of the information received from the user or service, such as the field names or schema characteristics may be converted to the canonical schema for use by an API in generating a response. However, if a service or other type of application generates a request by providing values for fields of a schema without accessing the first API, the field names, structural characteristics, or other characteristics of the temporary schema may not be included in the information received from the user or service. In such a case, a mismatch between the expected fields or other characteristics of the received information and the expected schema characteristics may be determined, and the request may be denied. In some cases, the temporary schema may expire based on time. For example, the temporary schema may include a field name or other data that is determined based on a timestamp. When a request is received, a current time may be determined. If the difference between the current time and the time associated with the timestamp exceeds a threshold interval of time, the request may be denied. Alternatively, if the difference is less than the threshold interval of time, a response may be generated.

In still other implementations, a combination of one or more nonces and schema characteristics may be used as identifiers. For example, in response to a first request, a response that includes one or more strings embedded within a URI may be provided, as well as data indicative of a schema that includes particular field names or a particular arrangement of fields. As another example, the schema itself may include a string as a field name or other part of the schema.

In some implementations, an identifier may include an indication of an API or other type of interface or service that generated the response that includes the identifier. For example, a first API may receive a request and provide a response that includes a URI indicating a second API and an identifier that includes an indication of the first API. The second API may process the request and add an indication to the identifier or modify a portion of the identifier to include an indication of the second API. In a similar manner, each API or other type of interface or service that generates a response may include an indication in the identifier. The identifier may then be used to determine whether a particular call pattern was used or whether one or more particular APIs were accessed.

In some implementations, denial of a request may include providing a notification to the source of the request indicating that the request was denied. In some cases, the notification may indicate a reason for the denial of the request, such as the absence of an expected identifier, or an instruction that a first API should be contacted prior to providing a request to a second API. In other implementations, a request may be denied without providing a notification. In still other implementations, a system may include multiple communication channels, such as a first communication channel having a greater throughput capacity or other throughput value than a second communication channel. A request that includes an expected identifier or a response to the request may be provided using the first communication channel. If a request does not include the expected identifier, but the resource indicator included in the request corresponds to a valid resource, the request or a response to that request may be provided using the second communication channel. In other cases, a user or service that has not obtained an identifier or does not wish to contact a first API to obtain an identifier may choose to provide requests using the second communication channel having the lower throughput value.

As one skilled in the art will appreciate in light of this disclosure, certain embodiments may be capable of achieving certain advantages. For example, use of identifiers to ensure that services and other types of applications provide requests using the most current versions of schemas, and provide requests to APIs in a desired order, may ensure that desired versions of content are presented to users, resulting in an improved user experience. Additionally, use of identifiers to indicate valid requests may enable an improper request to be identified and denied without expending computational resources to process the request. For example, denial of a request based on a lack of an expected identifier may prevent the use of computational resources that may be incurred by attempting to access the requested resources or generating a response. Denying requests based on improper or absent identifiers may also enable a user to identify improper use of APIs promptly, such as when developing an application that uses an API, before improper use of the API causes requests to fail due to a deprecated resource or changed schema. Use of identifiers to ensure that requests are provided to APIs or other types of interfaces in a desired order may also improve the security of systems. For example, malicious requests provided directly to a second API that do not include identifiers received from a first API may be denied without expending computational resources to attempt to access resources or generate responses. In some cases, use of identifiers may be used as a security measure that ensures that each request received by an API was provided by an expected previous API and includes an expected identifier. For example, identifiers may be used in addition to or in place of bearer tokens or similar access control features for OAuth or a similar security model.

Figure 1B:
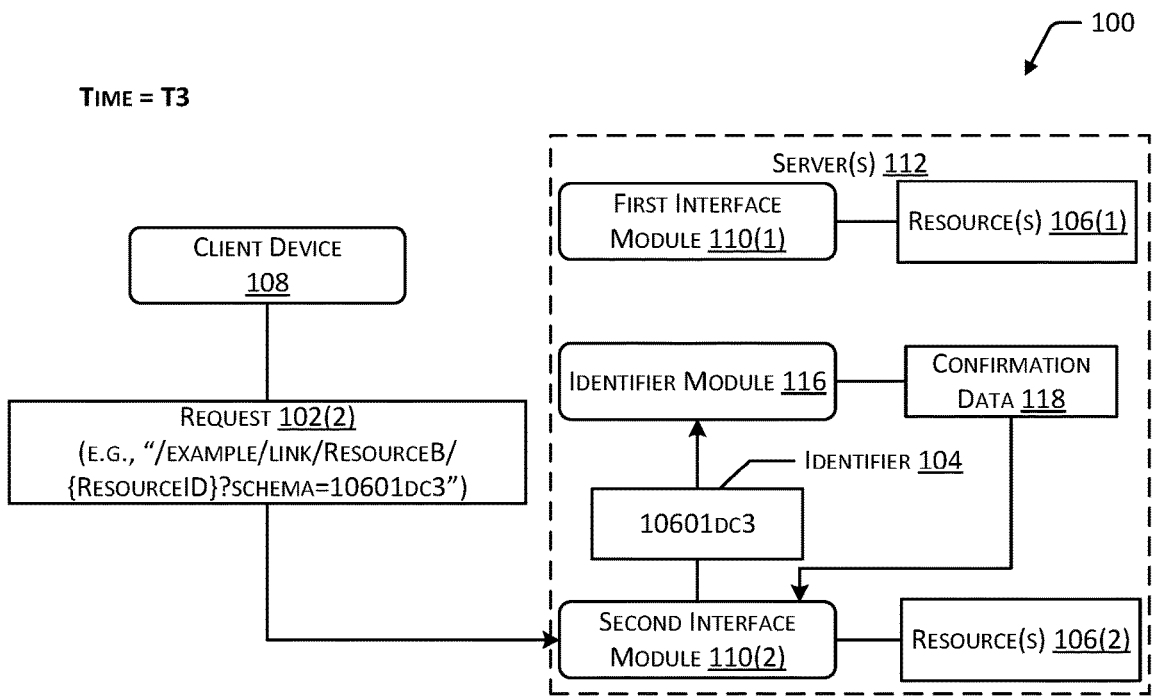
Figure 1B:
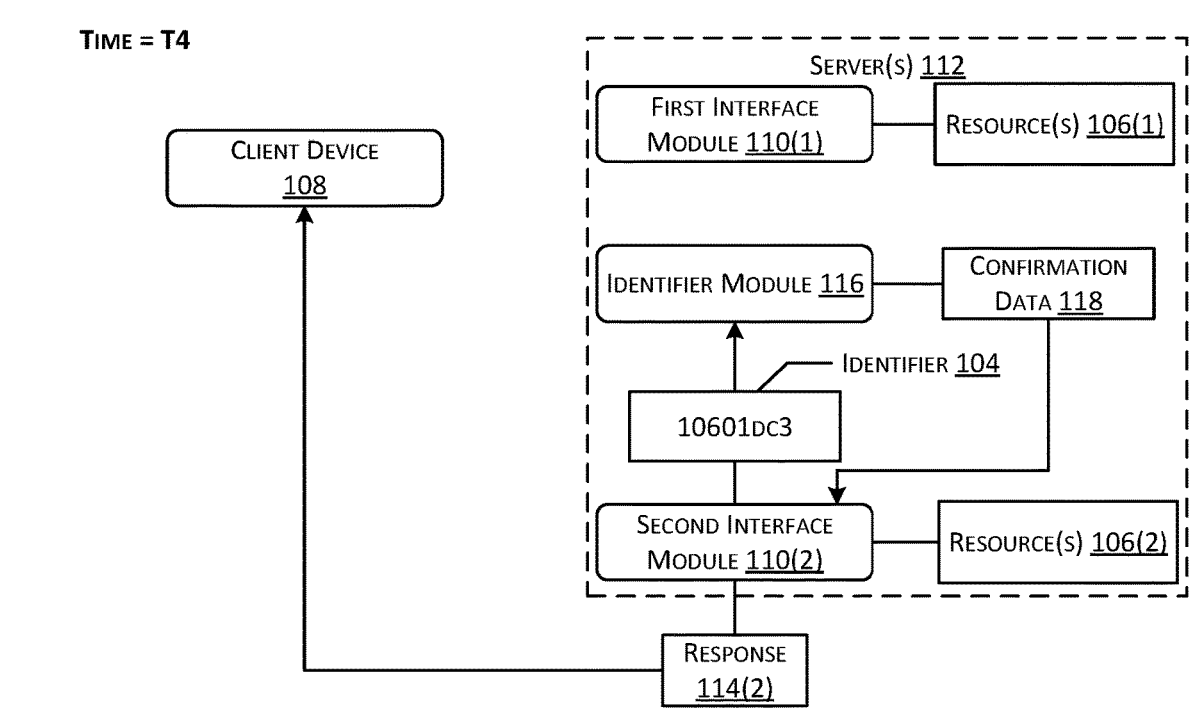

FIGS. 1A and 1B depict an implementation of a system 100 that may be used to determine requests 102 that have been provided in proper or improper manners based on identifiers 104 associated with APIs or resources 106. As shown in FIG. 1A, at a first time T1, a client device 108 or another type of computing device may provide a first request 102(1) to a first interface module 110(1) associated with one or more servers 112. The first interface module 110(1) may include an API or any other type of module that may be configured to receive requests 102 from computing devices and generate responses 114 indicative of one or more resources 106(1) or other interface modules 110. The client device 108 and the server(s) 112 may include any number or any type of computing devices including, without limitation, personal computing devices, portable computing devices, wearable computing devices, automotive computing devices, media devices, and so forth. Additionally, while FIG. 1 depicts a single client device 108 and server 112 for illustrative purposes, any number of computing devices may be used to send one or more requests 102 to any number of servers 112 or other types of computing devices.

The first request 102(1) may include a link, URI, query parameter, or other element that may indicate one or more of the first interface module 110(1) or a resource 106(1) associated with the first interface module 110(1). The first interface module 110(1) may be configured to generate a response 114(1) based on the parameters of the request 102(1) and the resources 106(1). In response to receipt of the request 102(1), an identifier module 116 associated with the server(s) 112 may determine an identifier 104 to be associated with the response 114(1). As shown in FIG. 1, in some implementations, the identifier 104 may include an alphanumeric string. For example, the first interface module 110(1) may embed the identifier 104 within a URI, query parameter, header, link, or other element that may be included in or indicated in the response 114(1) provided to the client device 108. Continuing the example, FIG. 1A depicts the response 114(1) including a link indicative of a second interface module 110(2) or second resource 106(2). The response 114(1) includes the identifier 104 as a query parameter. At a second time T2 subsequent to the first time T1, the response 114(1) may be provided to the client device 108. In some implementations, the identifier 104 may include an indication of the source of one or more requests 102 or responses 114. For example, an identifier 104 that has traversed through multiple APIs may indicate the call pattern that was used. Continuing the example, the identifier 104 of FIG. 1 may include an indication of the first interface module 110(1). When the identifier 104 is received by the second interface module 110(2), the indication of the first interface module 110(1) may be used to determine the validity of the identifier 104. In some cases, an identifier 104 may include an indication of the single previous API or other service or module that provided the identifier 104 to a computing device. For example, each API or interface module 110 may verify that one or more previous interface modules 110 received the request 102 prior to receipt of the request 102 by a current interface module 110. In other cases, the indication of each interface module 110 that was associated with generation of a response 114 to the client device 108 may be analyzed by the final interface module 110 or other module that receives the identifier 104 prior to transmitting a response 114 to the client device 108.

As shown in FIG. 1B, at a third time T3 subsequent to the second time T2, the client device 108 may provide a second request 102(2) to the second interface module 110(2). The second request 102(2) may indicate the link or other information received in the first response 114(1). The second request 102(2) may also include the identifier 104. For example, FIG. 1B depicts the second request 102(2) including a link associated with a second resource 106(2) that also includes an embedded identifier 104 in the form of an alphanumeric string presented as a query parameter. One or more of the second interface module 110(2) or the identifier module 116(1) may be configured to determine the identifier 104 within the request 102(2). The identifier module 116 may determine whether the identifier 104 of the second request 102(2) corresponds to the identifier 104 that was provided in the first response 114(1). In some implementations, the identifiers 104 may be determined to correspond if the identifiers 104 match. In other implementations, identifiers 104 may be determined to correspond if the identifiers 104 match within a threshold tolerance. For example, if an identifier 104 of the second request 102(2) differs from the identifier 104 of the first response 114(1) by less than a threshold number of characters or by a numerical or alphabetic value less than a threshold, the identifiers 104 may be determined to correspond. In other cases, the identifier module 116 may determine a mismatch between the identifiers 104. The identifier module 116 may provide confirmation data 118 to the second interface module 110(2) indicative of the correspondence or mismatch between the identifiers 104. If the confirmation data 118 indicates a match or correspondence between the identifiers 104, at a fourth time T4 subsequent to the third time T3, the second interface module 110(2) may provide a response 114(2) to the client device 108, such as a response 114(2) that includes or indicates a resource 106(2). If the confirmation data 118 indicates a mismatch between the identifiers 104, the second interface module 110(2) may deny the request 102(2). In some implementations, when the request 102(2) is denied, a notification indicating the denial may be provided to the client device 108. In some cases, the notification may indicate a reason for the denial, such as an incorrect identifier 104 or an instruction to obtain a link and identifier 104 from the first interface module 110(1) prior to providing a request 102 to the second interface module 110(2). In other implementations, the request 102(2) may be denied without providing a notification to the client device 108.

By associating identifiers 104 with responses 114(1) provided by the first interface module 110(1), use of the most current URIs, query parameters, headers, links, schema, or other elements by the client device 108 may be ensured. For example, on each occasion that the client device 108 provides a request 102 to the first interface module 110(1), a response 114 that includes the most current link or other type of resource indicator that indicates the second interface module 110(2) or second resource 106(2) may be generated. A unique identifier 104 may also be associated with the response 114. Receipt of a request 102 that includes the unique identifier 104 may indicate that the request 102 is associated with a current resource indicator rather than an invalid, stale, or deprecated version of the resource indicator. Conversely, if the client device 108 provides a request 102 directly to the second interface module 110(2) without first providing a request 102 to the first interface module 110(1), the request 102 will not include a valid identifier 104. Requests 102 that lack a valid identifier 104 may be denied without consuming computational resources attempting to access the interface module 110 or resource 106 associated with the request 102. Additionally, in some cases, a resource indicator for the second interface module 110(2) or second resource 106(2) may be changed, or the second interface module 110(2) or second resource 106(2) may be deprecated and replaced with a different interface module 110 or resource 106. In such a case a request 102 that is provided directly to the second interface module 110(2) and includes a resource indicator for the second interface module 110(2) or second resource 106(2) would fail. However, if a first request 102 is provided to the first interface module 110(1), a response 114(1) that includes a resource indicator for the interface module 110 or resource 106 that replaced the second interface module 110(2) or second resource 106(2) may be provided to the client device 108, along with a valid identifier 104. A subsequent request 102 that includes the most recent resource indicator may then also include the valid identifier 104.

Figure 2:
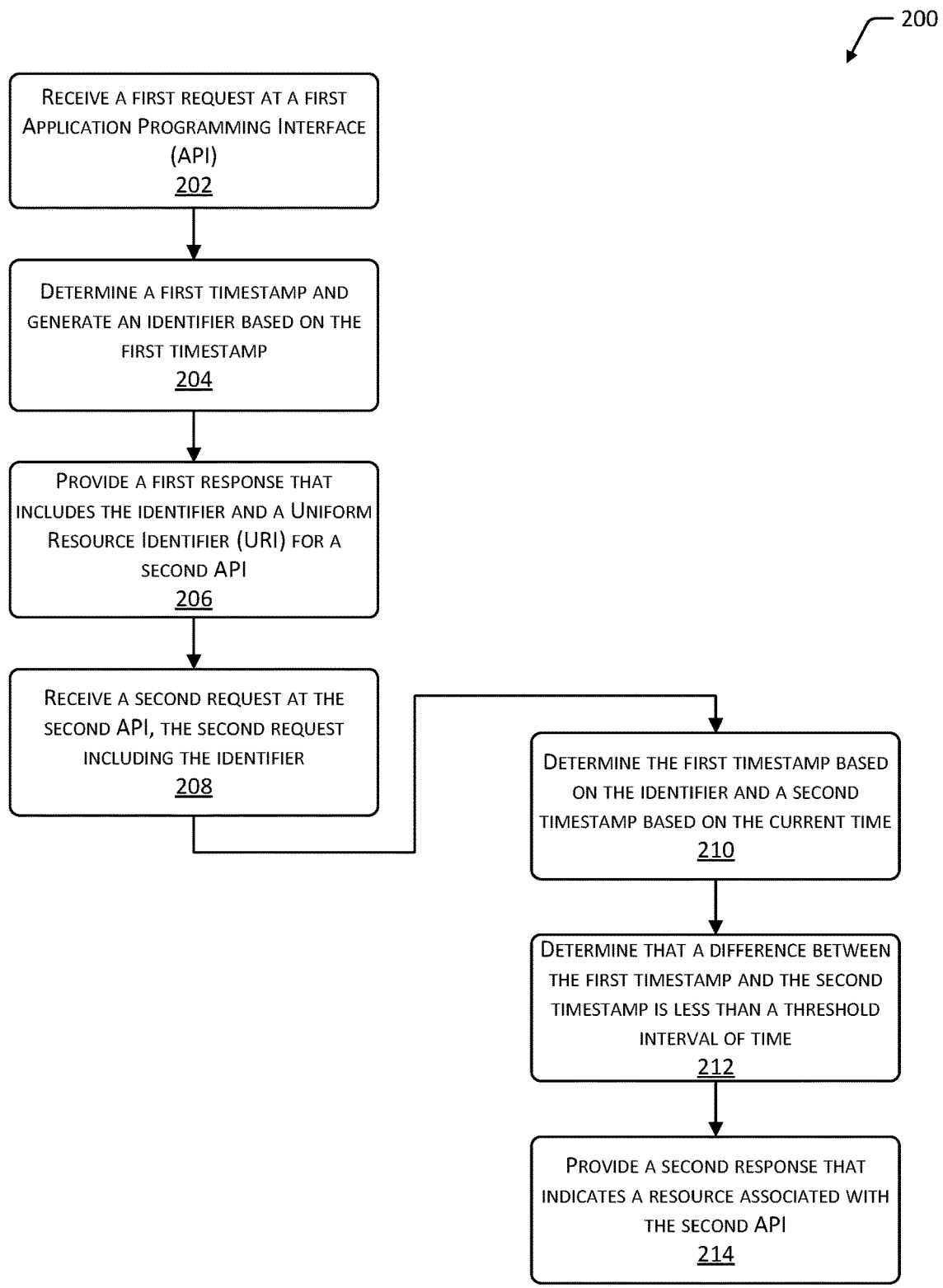
FIG. 2 depicts a flow diagram illustrating an implementation of a method that may be used to determine valid identifiers and requests based in part on timestamps.

FIG. 2 depicts a flow diagram 200 illustrating an implementation of a method that may be used to determine valid identifiers 104 and requests 102 based in part on timestamps. At 202, a first request 102 may be received at a first Application Programming Interface (API) or other type of interface, module, resource 106, and so forth. For example, a request 102 may be provided to an API to access a resource 106 associated with the API or to receive information associated with a different API. Continuing the example, an API may be configured to provide schemas, links, or other types of resource indicators that may be used to access another API. When such an API receives a request 102, the first API may provide a response 114 that includes a URI or other type of resource indicator for a second API.

At 204, a first timestamp may be determined and an identifier 104 may be generated based on the first timestamp. For example, the first timestamp may correspond to a time at which the request 102 was received by the first API or a time at which a response 114 is generated. The first timestamp may be determined by one or more clocks associated with the API or with another module or device that is in communication with the API. For example, in some cases, the first timestamp may be determined by an identifier module 116 in communication with the first API. In some implementations, the identifier 104 may include an alphanumeric string based on the first timestamp. For example, the identifier 104 may include the timestamp itself. In other cases, the identifier 104 may include an alphanumeric string that is formed by adding, removing, or changing characters within the timestamp. In some implementations, the identifier 104 may be generated by encrypting the timestamp or an alphanumeric string based on the timestamp.

At 206, a first response 114 that includes the identifier 104 and a Uniform Resource Identifier (URI) for a second API may be provided to the source of the request 102. As described previously, in some implementations, the identifier 104 may be embedded within a URI, query parameter, header, link, or other element associated with a resource 106. For example, the first response 114 may indicate a query parameter that includes the identifier 104 "10601dc3", such as "/orders/{orderId}?schema="10601dc3". As another example, the first response 114 may indicate a Uniform Resource Locator (URL) path parameter such as "/requests/{10601dc3}".

At 208, a second request 102 may be received at the second API. The second request 102 may include the identifier 104 as well as the URI indicative of the second API or a resource 106 associated with the second API. At 210, the first timestamp may be determined based on the identifier 104 and a second timestamp may be determined based on the current time. For example, as described with regard to block 204, the identifier 104 may include the first timestamp, an alphanumeric string based on the timestamp, an encrypted version of the timestamp or an associated string, and so forth. Based on the process by which the identifier 104 is generated using the first timestamp, the first timestamp may be determined using the identifier 104. The second timestamp may be determined by the second API or another module or resource in communication with the second API and may be indicative of a time at which the second request 102 is received by the second API.

At 212, a determination may be made that a difference between the first timestamp and the second timestamp is less than a threshold interval of time. For example, an identifier 104 may be valid for a length of time equal to the threshold interval of time. As such, if a request 102 that includes the identifier 104 is received shortly after generation of the identifier 104, the interval of time between the first and second timestamps may be less than the threshold interval of time. In such a case, at 214, a second response 114 that indicates a resource 106 associated with the second API may be provided to the source of the second request 102. However, if a request 102 that includes the identifier 104 is received at a future time after generation of the identifier 104, such that the interval of time between the first and second timestamps is greater than the threshold interval of time, the request 102 may be denied.

Use of timestamps to determine the validity of an identifier 104 may conserve computational resources by obviating the need to compare a received identifier 104 to a previously-generated identifier 104. For example, rather than comparing the text of an identifier 104 associated with a request 102 to one or more other identifiers 104, the time associated with the identifier 104 may be compared to a current time to determine whether a threshold interval of time has passed since generation of the identifier 104.

Figure 3:
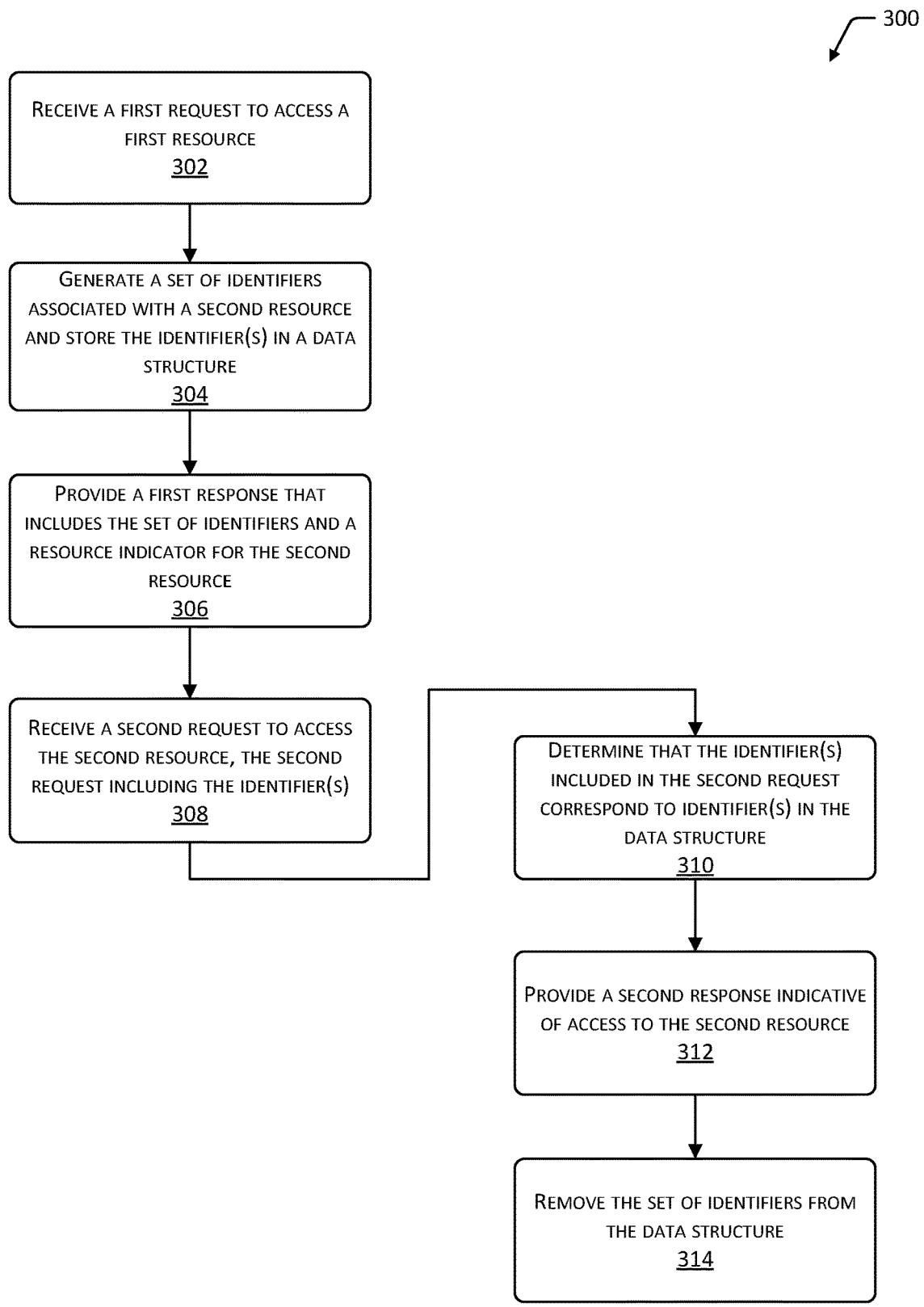
FIG. 3 depicts a flow diagram illustrating an implementation of a method that may be used to determine valid identifiers and requests based in part on a data structure that stores valid identifiers.

FIG. 3 depicts a flow diagram 300 illustrating an implementation of a method that may be used to determine valid identifiers 104 and requests 102 based in part on a data structure that stores valid identifiers 104. At 302, a first request 102 to access a first resource 106 may be received. As described with regard to FIGS. 1 and 2, a request 102 may be provided to an API or other type of interface or module. The request 102 may include parameters such as an indication of a resource 106 to which access is requested, a resource indicator, and so forth.

At 304, a set of identifiers 104 associated with a second resource 106 may be generated and stored in a data structure associated with valid identifiers 104. For example, an identifier 104 may include an alphanumeric string or other type of indicator embedded within a URI, query parameter, header, or other element associated with a request 102, response 114, or resource 106. In some implementations, multiple identifiers 104 may be used, such as to prevent a user from attempting to detect and use an identifier 104 that is provided in a response 114. For example, a set of identifiers 104 may include multiple strings or characters embedded within a combination of query parameters, headers, URIs, portions of a schema, and so forth. A set of generated identifiers 104 or data indicative of the identifiers 104 may be stored in a list, database, array, or other type of data structure such that when a subsequent request 102 is received, the identifier(s) 104 included in the request 102 may be compared with the identifier(s) 104 stored in the data structure.

At 306, a first response 114 that includes the set of identifiers 104 and a resource indicator for a second resource 106 may be provided to the source of the first request 102. At a subsequent time, at 308, a second request 102 to access the second resource 106 may be received. The second request 102 may include the identifier(s) 104.

At 310, the identifier(s) 104 included in the second request 102 may be determined to correspond to identifier(s) 104 in the data structure. For example, an API or other type of interface or module that receives the second request 102 may be configured to determine or extract the identifier(s) 104 from the request 102. Continuing the example, based on the manner in which the identifier(s) 104 were generated and embedded into the URI, link, header, query parameter, or other element, an API or other module that receives the second request 102 may locate the identifier(s) 104 within the request 102. Identifiers 104 determined in the request 102 may be compared to identifiers 104 stored in the data structure. If the identifiers 104 of the request 102 match those of the data structure within a threshold tolerance, a response 114 may be generated and provided to the source of the request 102. If the identifiers 104 of the request 102 do not match those of the data structure within a threshold tolerance, the request 102 may be denied.

At 312, a second response 114 indicative of access to the second resource 106 may be provided in response to the identifiers of the request 102 matching those of the data structure within a threshold tolerance. At 314, the set of identifiers 104 may be removed from the data structure. For example, after the second request 102 is received, the identifier(s) 104 may be removed to prevent subsequent requests 102 to access the second resource 106 and include the identifier(s) 104 to be used without first providing a request 102 to access the first resource 106. At a subsequent time, if a request 102 that includes the set of identifiers 104 is received, the request 102 may be denied.

Figure 4A:
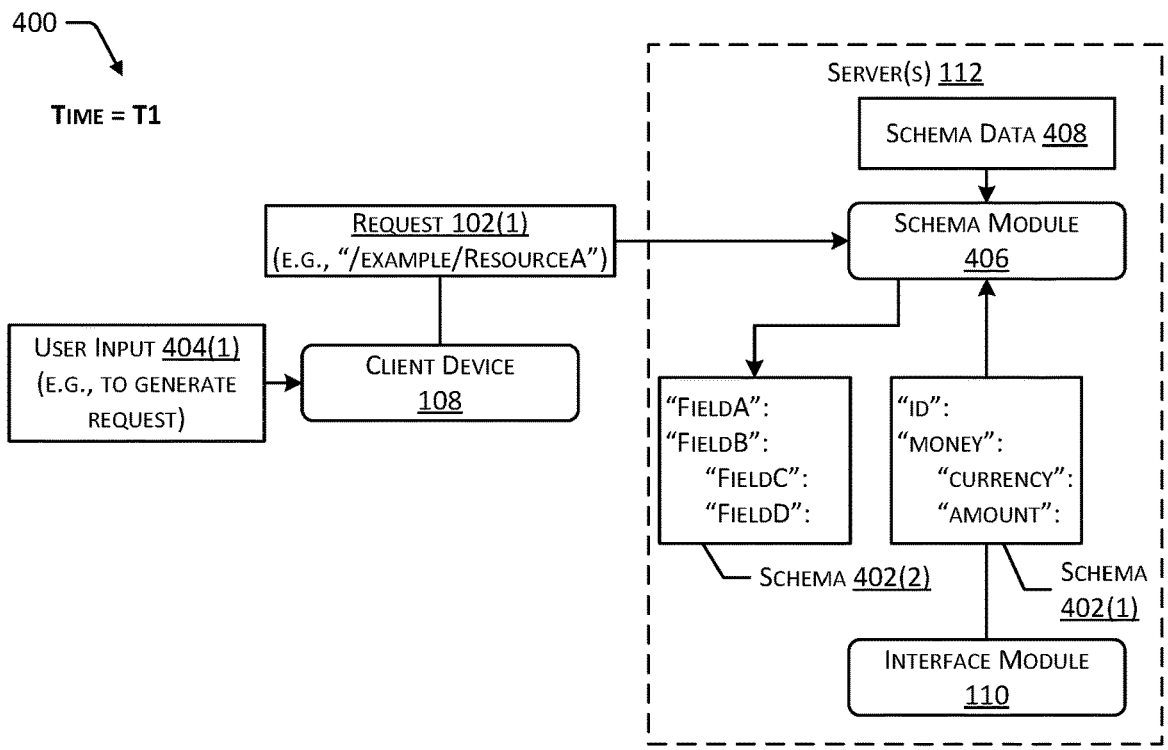
FIGS. 4A and 4B depict an implementation of a system that may be used to determine requests that have been provided in proper or improper manners based on characteristics of schema used to generate requests and responses.
Figure 4A:
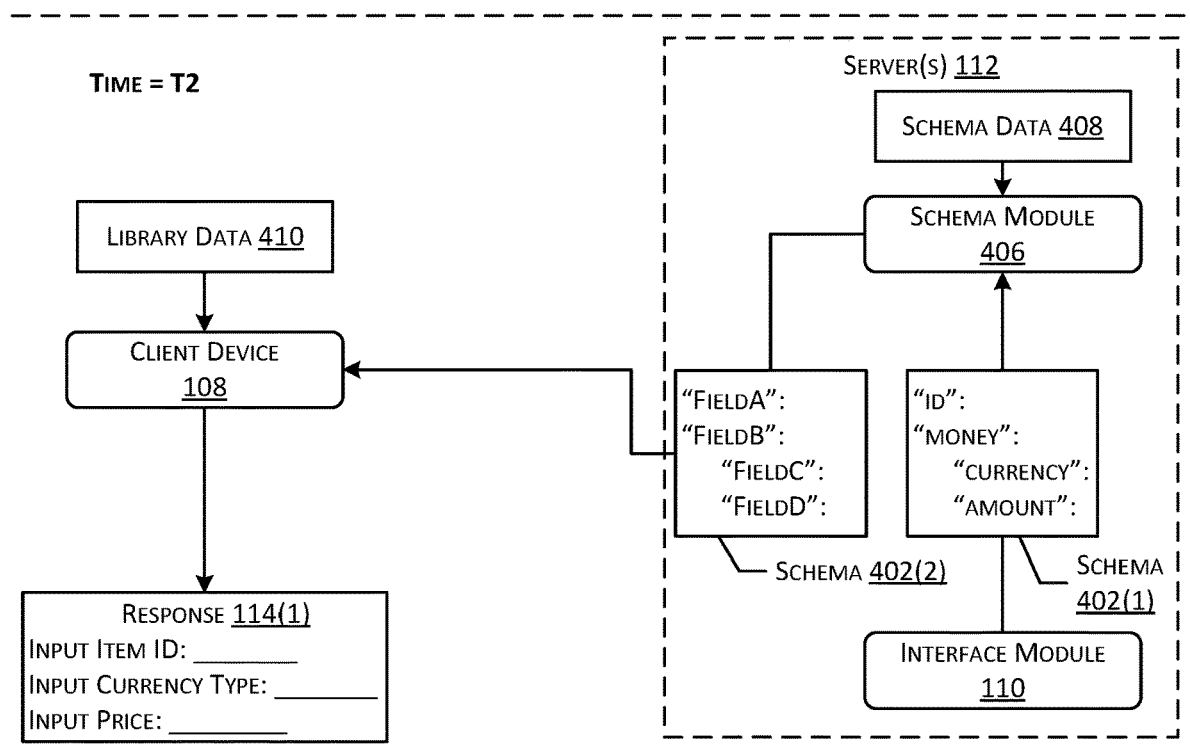
Figure 4B:
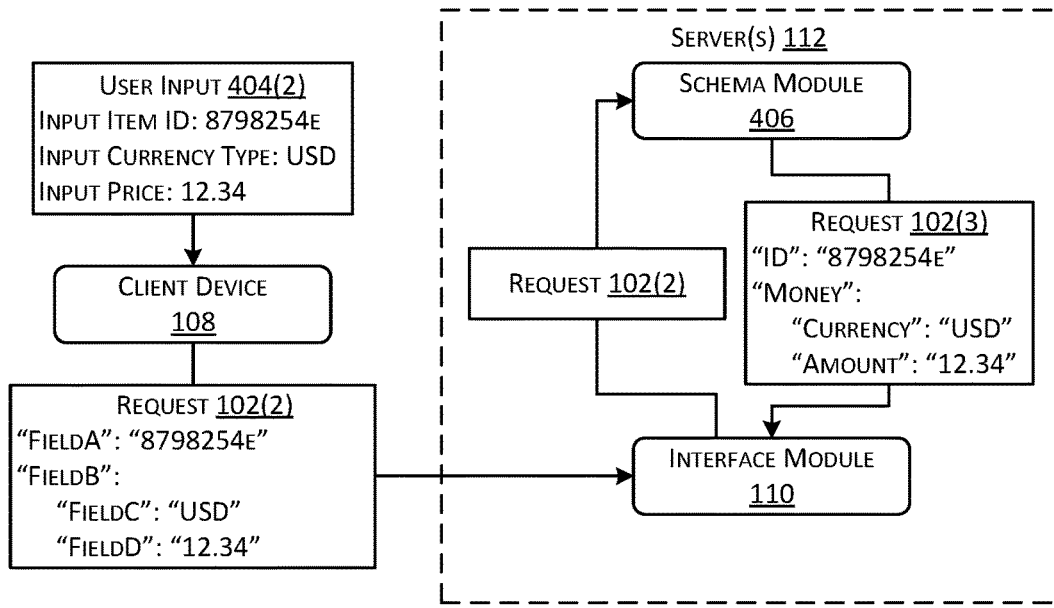
Figure 4B:
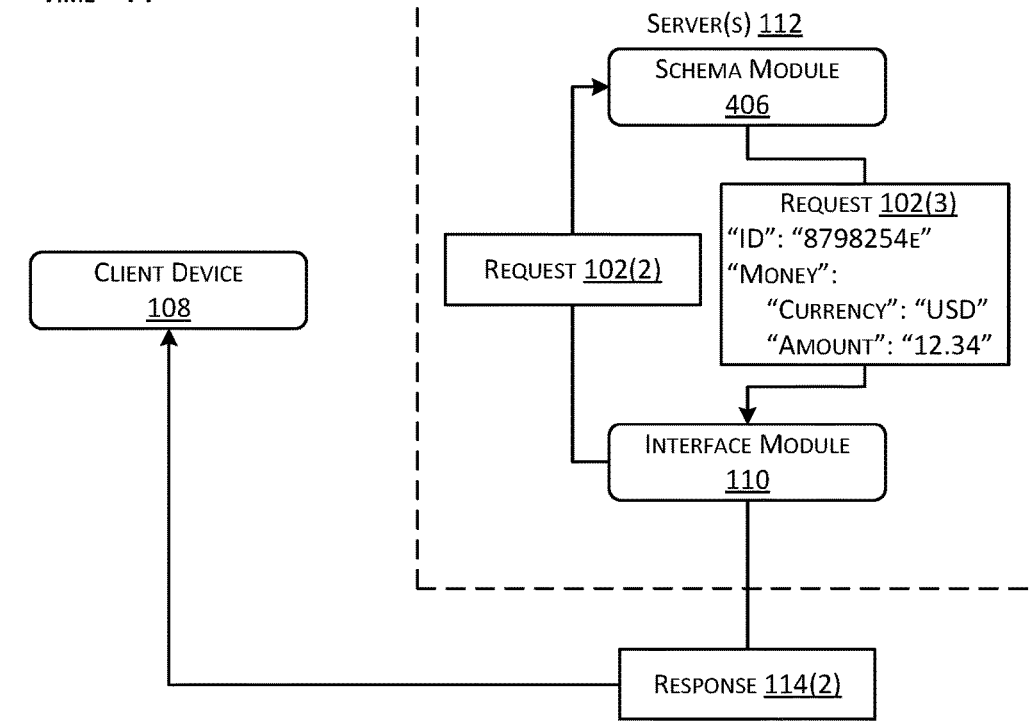

FIGS. 4A and 4B depict an implementation of a system 400 that may be used to determine requests 102 that have been provided in proper or improper manners based on characteristics of schema 402 used to generate requests 102 and responses 114. As shown in FIG. 4A, at a first time T1, user input 404(1) may be provided to a client device 108. The user input 404(1) may be used to generate a first request 102(1). For example, the user input 404(1) may include a selection or other indication of a resource 106, API, interface module 110, or other module associated with one or more servers 112. Based on the user input 404(1) the client device 108 may generate a request 102(1), such as a query, URI, or other element that may be used to request access to a resource 106, API, interface module 110, and so forth.

In response to the request 102(1), a schema module 406 associated with the server(s) 112 may determine a first schema 402(1) associated with the interface module 110. While FIG. 4 depicts the schema module 406 receiving the first request 102(1), in other implementations, the interface module 110 may receive the first request 102(1) and provide data indicative of the first request 102(1) to the schema module 406. For example, the interface module 110 may be configured to receive requests 102 that include values for a specific set of fields represented by the first schema 402(1) and generate a response 114 based on the values included in the first schema 402(1). Continuing the example, FIG. 4A depicts the first schema 402(1) including the fields "ID", "money", "currency", and "amount", with the fields "currency" and "amount" being related to and beneath the field "money".

The schema module 406 may determine a second schema 402(2) based on the first schema 402(1). In some implementations, the schema module 406 may access schema data 408 that associates one or more schema characteristics of the second schema 402(2) with corresponding characteristics of the first schema 402(1). For example, the schema data 408 may associate alternate field names for the second schema 402(2) with field names of the first schema 402(1). In other cases, the second schema 402(2) may include a different arrangement of fields when compared to the first schema 402(1), or a combination of different field names and arrangements of fields. For example, FIG. 4A depicts the second schema 402(2) including the alternate field names "FieldA", "FieldB", "FieldC", and "FieldD". In other implementations, the schema module 406 may function as an identifier module 116 that generates a string or other type of identifier 104 to be used as a field name for a schema 402. In some cases, the identifier 104 may be based in part on a timestamp, a source of a response 114, and so forth. As such, identifiers 104 may be used as schema characteristics, headers, URIs, query parameters, and so forth. For example, an identifier 104 generated by the schema module 406 may represent a schema 402 and be used to generate output.

In response to the request 102(1), at a second time T2 subsequent to the first time T1, the schema module 406 or the interface module 110 may provide the second schema 402(2) to the client device 108. The client device may generate a first response 114(1), such as a form for receiving additional user input 404(2) for a second request 102(2), based on the second schema 402(2). For example, the client device 108 may access library data 410 that may associate elements of a form, such as text labels and fields for receiving user input 404(2) with elements of the second schema 402(2), and may generate the first response 114(1) based in part on the library data 410. In other implementations, one or more of the schema module 406 or the interface module 110 may generate the first response 114(1) based on the second schema 402(2) and provide the first response 114(1) to the client device 108.

As shown in FIG. 4B, at a third time T3 subsequent to the second time T2, the client device 108 may generate a second request 102(2) based on second user input 404(2). For example, the second user input 404(2) may include input using a form or other element associated with the first response 114(1). Based on the second user input 404(2) and the second schema 402(2), the client device 108 may generate a request 102(2) that includes values determined from the user input 404(2) that are associated with fields of the second schema 402(2). The interface module 110, or another module associated with the server(s) 112, may receive the second request 102(2). Because the interface module 110 is configured to process requests 102 associated with the first schema 402(1) rather than the second schema 402(2), the interface module 110 may provide data indicative of the second request 102(2) to the schema module 106. In other implementations, the schema module 106 may receive the request 102(2) from the client device 108.

Based on the second request 102(2), the schema module 406 may generate a third request 102(3) that includes values of the second request 102(2) associated with field names or other characteristics of the first schema 402(1). For example, FIG. 4B depicts the second request 102(2) including values associated with the field names of the second schema 402(2) and the third request 102(3) including values associated with the field names of the first schema 402(1). The interface module 110 may generate a second response 114(2) based on the third request 102(3) due to the third request 102(3) including values that are associated with the first schema 402(1). At a fourth time T4 subsequent to the third time T3, the response 114(2) may then be provided to the client device 108.

Use of the schema module 406 to determine the second schema 402(2) based on the first schema 402(1) and to determine the third request 102(3) that includes elements of the first schema 402(1) based on the second request 102(2) that includes elements of the second schema 402(2), elements of the second schema 402(2) may be used to identify valid requests 102. For example, elements of the second schema 402(2) may function as identifiers 104, as described with regard to FIGS. 1-3. Periodically or in response to a request 102, the schema module 406 may determine a second schema 402(2) based on the first schema 402(1). For example, once per hour, once per minute, or each time a request 102 is received, the schema module 406 may generate a set of field names that differ from those of the first schema 402(1). Independent of the characteristics of the second schema 402(2), the content of the first response 114(1) presented using the client device 108 may remain identical. For example, a user of the client device 108 may remain unaware that the user input 404(2) provided to a form is being associated with fields of the second schema 402(2) rather than the first schema 402(1). Additionally, independent of the characteristics of the second schema 402(2), the received request 102(2) may be processed to generate a request 102(3) that includes characteristics of the first schema 402(1). As a result, the interface module 110 may be provided with requests 102(3) that include the fields of the first schema 402(1) suitable for preparation of a response 114(2) by the interface module 110.

If a request 102 is received that lacks the field names or other characteristics of the second schema 402(2), the request 102 may be denied. As such, the characteristics of the second schema 402(2) may function as identifiers 104 for determining valid requests 102 and ensuring that a first request 102(1) to obtain the most current version of a schema 402 or form is provided prior to providing a second request 102(2) that includes values for a form or schema 402. As a result, users may be prevented from providing requests 102 using deprecated versions of a form or schema 402, as those requests 102 would not include the characteristics of the second schema 402(2) and may be denied. In cases where a request 102 lacks the expected characteristics of a schema 402, the request 102 may be denied without consuming computational resources attempting to process the request 102, such as by attempting to access an API or resource 106 indicated by the request 102.

Figure 5:
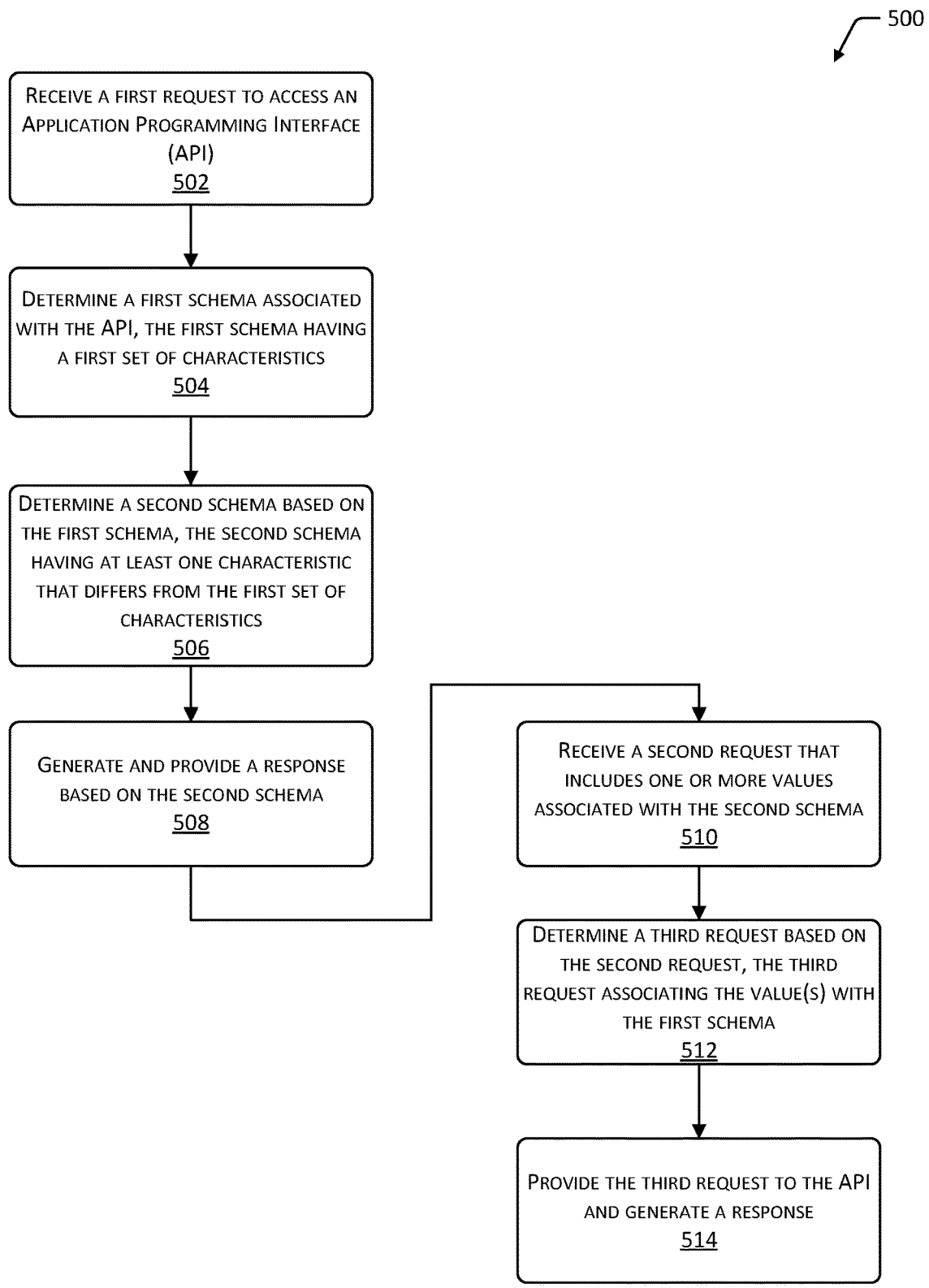
FIG. 5 depicts a flow diagram illustrating an implementation of a method that may be used to determine requests that have been provided in proper or improper manners based on characteristics of schema used to generate requests and responses.

FIG. 5 depicts a flow diagram 500 illustrating an implementation of a method that may be used to determine requests 102 that have been provided in proper or improper manners based on characteristics of schema 402 used to generate requests 102 and responses 114. At 502, a first request 102 to access an Application Programming Interface (API) may be received. As described with regard to FIGS. 1-3, a request 102 may be provided to an API or another type of interface or module. The request 102 may include parameters such as an indication of a resource 106 to which access is requested, a resource indicator for an API, and so forth.

At 504, a first schema 402 associated with the API may be determined. The first schema 402 may include a first set of characteristics, such as field names and an arrangement of fields. For example, the API may be configured to generate responses 114 based on requests 102 that include values for particular fields of the first schema 402.

At 506, a second schema 402 may be determined based on the first schema 402. The second schema 402 may include at least one characteristic that differs from the first set of characteristics of the first schema 402. For example, as described with regard to FIG. 4, a second schema 402 may be determined by modifying or replacing one or more field names of the first schema 402 or changing the arrangement of fields within the first schema 402. In some implementations, the second schema 402 may include one or more additional fields that are not present in the first schema 402, or the second schema 402 may be determined by removing one or more fields from the first schema 402. Additionally, in some implementations, the second schema 402 may include an identifier 104 or may itself function as an identifier 104, as described with regard to FIGS. 1-3. For example, a portion of a schema 402 may include a string determined by an identifier module 116, based on a timestamp, based on a source of a request 102 or response 114 such as an interface module 110 that generated the response 114 or the identifier 104, and so forth.

At 508, a response 114 may be generated based on the second schema 402 and provided to a source of the request 102. In some implementations, the response 114 may include a form or other type of interface that may receive values or other types of user input 404 for generation of a subsequent request 102, or data that may be used to generate a form or interface. For example, the second schema 402 may be used to generate a form for receiving values for one or more fields of the second schema 402.

At 510, a second request 102 that includes one or more values associated with the second schema 402 may be received. For example, the second request 102 may be generated based on user input 404 provided to a form or other type of interface. Due to data indicative of the second schema 402 being provided to the source of the first request 102, the second request 102 may include the characteristic(s) of the second schema 402. If a form or other type of interface is generated based on the second schema 402, a user providing the second request 102 or coding a service to provide the second request 102 may be unaware of the second schema 402.

At 512, a third request 102 may be determined based on the second request 102. The third request 102 may associate the value(s) of the second request 102 with the first schema 402. For example, an API may be configured to process requests 102 that include values within fields of the first schema 402. A schema module 406, the API, or another module in communication with the API may be configured to process requests 102 that include values within fields of the second schema 402 to generate values within fields of the first schema 102, such as by changing the names or arrangement of fields to those of an original (e.g., canonical) schema 402. As a result, the API may receive requests 102 that include values within fields of the first schema 402 independent of the characteristics of the second schema 402 that was associated with the first response 114 or second request 102.

At 514, third request 102 may be provided to the API and a response 114 may be generated based on the third request 102. In cases where the second request 102 lacks the characteristics of the second schema 402, generation of the third request 102 may not be possible. In other cases, requests 102 that lack the characteristics of the second schema 402 may be denied. As a result, the characteristics of the second schema 402 may be used as an identifier 104 to determine valid requests 102 and ensure that a request 102 was previously provided to determine the most current version of a schema 402 prior to providing a request 102 that includes values within the fields of a schema 402 to an API.

Figure 6:
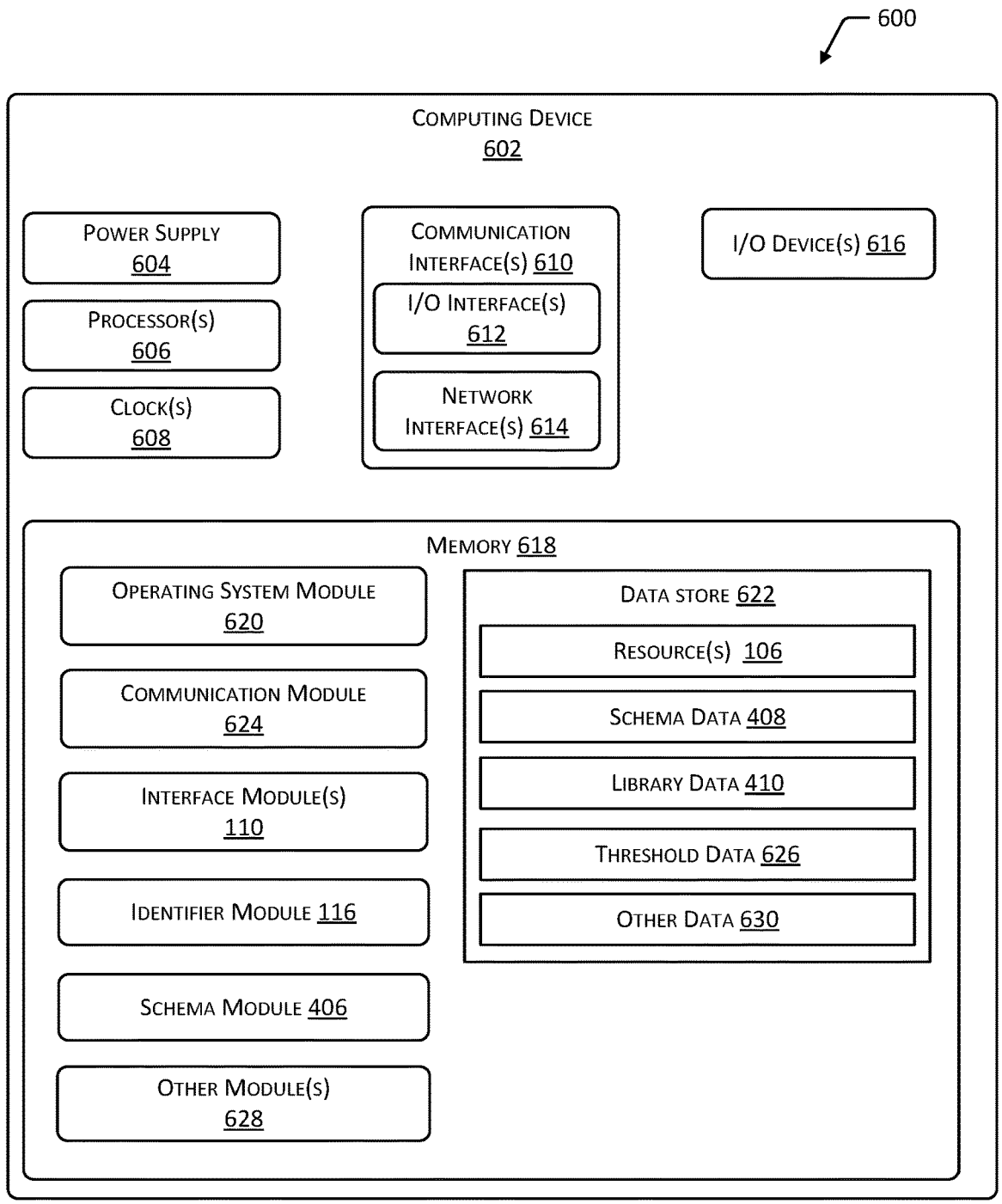
FIG. 6 is a block diagram illustrating an implementation of a computing device within the present disclosure.

FIG. 6 is a block diagram 600 depicting an implementation of a computing device 602 within the present disclosure. The computing device 602 may include a server 112, a client device 108, or any other type of computing device 602 in communication with one or more of a server 112 or client device 108. Additionally, while FIG. 6 depicts a single block diagram 600 of a computing device 602, any number and any type of computing devices 602 may be used to perform the functions described herein. For example, any combination of servers 112, client devices 108, or other types of computing devices 602 may be used to generate requests 102, identifiers 104, schemas 402, and responses 114.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth. Continuing the example, data from a clock 608 may be used to determine a time when a request 102, an identifier 104, a schema 402, or a response 114 is generated or received. Continuing the example, a request 102 may be accepted or denied based on a relationship between a threshold interval of time and an interval of time between generation of an identifier 104 and receipt of a request 102 that includes the identifier 104.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input devices or output devices associated with the computing device 602. For example, I/O devices 616 may include displays, touch sensors integrated with displays (e.g., touchscreen displays), other types of sensors, keyboards, mouse devices, microphones, image sensors, cameras, scanners, speakers, haptic devices, printers, and so forth. In some implementations, the I/O devices 616 may be physically incorporated with the computing device 602. In other implementations, I/O devices 616 may be externally placed.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 1014 may include devices compatible with Ethernet, Wi-Fi, Bluetooth, ZigBee, Z-Wave, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store one or more interface modules 110. Interface modules 110 may include APIs or other types of modules, services, and so forth that may be configured to receive requests 102, generate responses 114, and provide access to resources 106. As described with regard to FIGS. 4 and 5, in some implementations, an interface module 110 may be configured to process requests 102 associated with a particular schema 402.

The memory 618 may additionally store an identifier module 116. As described with regard to FIGS. 1-3, the identifier module 116 may generate one or more identifiers 104 to be included with a response 114. In some implementations, an identifier 104 may include a string, such as an alphanumeric string, embedded within a Uniform Resource Identifier (URI), query parameter, header, link, or other element associated with a resource 106 or interface. The identifier module 116 may also determine the presence of identifiers 104 within a received request 102. For example, the identifier module 116 may determine, based on data from one or more clocks 608 whether an interval of time between a first time when an identifier 104 was generated and a second time when a request 102 was received is less than a threshold interval of time, indicated in threshold data 626. As another example, the identifier module 116 may determine correspondence between one or more identifiers 104 within a received request 102 and a data structure that stores one or more identifiers 104 that have previously been provided in responses 114. In some implementations, the identifier module 116 may remove an identifier 104 from the data structure after receiving a request 102, or a threshold count of requests 102 indicated in threshold data 626, that includes the identifier 104. The identifier module 116 may access one or more rules, algorithms, and so forth that indicate the manner in which identifiers 104 may be generated based on requests 102, data from a clock 608, or other types of data. The identifier module 116 may also use such rules, algorithms, and so forth to determine and extract identifiers 104 from a request 102, such as by identifying an algorithm embedded in a URI, header, or query parameter of a request 102.

The memory 618 may also store the schema module 406. As described with regard to FIGS. 4-5, the schema module 406 may determine schemas 402 associated with APIs and other types of interfaces or resources 106 and may generate alternate schemas 402 based on these schemas 402. For example, schema data 408 may associate characteristics of alternate schemas 402 with those of existing schemas 402, such as names of fields or arrangements of fields. As another example, schema data 408 may indicate one or more rules or algorithms for generating alternate schemas 402 based on existing schemas 402. When a request 102 is received, the schema module 406 may also determine whether the request 102 includes characteristics of a particular schema 402. Based on a received request 102 the schema module 402 may generate an alternate request associated with the original schema 102 that is suitable for processing by an API or other type of interface or module.

Other modules 628 may also be present in the memory 618. For example, user input modules may be used to receive user input 404 to modify threshold data 626, library data 410, resources 106, and so forth. Other modules 634 may also include encryption modules to encrypt and decrypt communications between computing devices 602. For example, an identifier 104 or a response 114 that includes an identifier 104 may be encrypted, hashed, or otherwise obfuscated. A computing device 602 that receives the identifier 104 or a subsequent request 102 that includes the identifier 104 may be configured to decrypt the identifier 104 or hash value. Other modules 634 may additionally include authentication modules to authenticate communications sent or received by computing devices 602, a permission module to assign, determine, and manage user permissions to access or modify data associated with computing devices 602, and so forth. Other modules 634 may also include modules for detecting characteristics of a computing device 602, such as hardware or software components of a device, locations of a computing device 602, and so forth. Other modules 634 may additionally include modules for random or pseudo-random generation of numbers, strings, and so forth. For example, random generation of numbers or text may be used for generation of identifiers 104.

Other data 630 within the data store(s) 622 may include configurations, settings, preferences, and default values associated with computing devices 602. Other data 636 may also include encryption keys and schema, access credentials, and so forth. Other data 636 may also include rules or algorithms for generating or determining identifiers 104 and schemas 402.

In different implementations, different computing devices 602 may have different capabilities or capacities. For example, servers 112 may have greater processing capabilities or data storage capacity than client devices 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive, from a computing device, a first request to access a first resource at a first application programming interface, wherein the first resource includes a first resource indicator that is indicative of a second resource;
generate a first identifier associated with the second resource, wherein the first identifier includes one or more of:
an alphanumeric string added within one or more of a Uniform Resource Identifier (URI), a header, or a query parameter associated with the second resource;
a field name associated with a schema; or
a field arrangement associated with a schema;
provide, to the computing device, a first response that includes the first identifier and the first resource indicator;
receive, from the computing device, a second request to access the second resource at a second application programming interface, wherein the second request includes the first identifier;
determine that the first identifier of the second request matches the first identifier associated with the second resource;
in response to the first identifier of the second request matching the first identifier associated with the second resource, provide, to the computing device, a second response indicative of the second resource;
modify the first resource to include a second resource indicator that is indicative of a third resource;
generate a second identifier associated with the third resource;
receive, from the computing device, a third request to access the second resource at the second application programming interface;
determine that the third request lacks the second identifier; and
deny the third request.

2. The system of claim 1, wherein the first identifier associated with the second resource is generated based in part on a timestamp, the system further comprising computer-executable instructions to:
determine the timestamp in response to the first identifier of the second request;
determine a first time indicated by the timestamp;
determine a current time;
determine an interval of time based on the first time and the current time; and
determine that the interval of time is less than a threshold interval of time, wherein the first identifier of the second request matching the first identifier associated with the second resource is determined based in part on the interval of time being less than the threshold interval of time.

3. The system of claim 1, wherein the first identifier includes a first field name associated with the schema, the system further comprising computer-executable instructions to:
cause the computing device to present a user interface for receiving a value, wherein the second request includes the value and the first field name; and
in response to the first identifier of the second request matching the first identifier associated with the second resource, determine a second field name based on the first field name, wherein the second response is generated based in part on the second field name.

4. A method comprising:
receiving a first request to access a first resource;
generating a first identifier associated with a second resource, wherein the first identifier includes a string within a first resource indicator, wherein the first resource indicator is associated with the second resource;
sending a first response, wherein the first response includes the first identifier and the first resource indicator;
storing the first identifier in a data structure;
receiving a second request to access the second resource, wherein the second request includes a second identifier;
determining correspondence between the second identifier of the second request and the first identifier in the data structure;
based on the correspondence between the first identifier and the second identifier, performing a first action associated with the second request;
removing the first identifier from the data structure;
receiving a third request to access the second resource, wherein the third request includes the first identifier;
determining a mismatch between the first identifier of the third request and one or more identifiers stored in the data structure; and
in response to the mismatch, performing a second action associated with the third request.

5. The method of claim 4, wherein the correspondence between the first identifier and the second identifier indicates a match between the first identifier and the second identifier, the method further comprising:
determining a first communication channel and a second communication channel for providing a second response, wherein the first communication channel has a first throughput value, the second communication channel has a second throughput value, and the first throughput value is greater than the second throughput value; and
in response to the match, providing the second response using the first communication channel.

6. The method of claim 4, further comprising:
determining a first communication channel and a second communication channel for providing a second response based on the mismatch between the first identifier and the one or more identifiers stored in the data structure, wherein the first communication channel has a first throughput value, the second communication channel has a second throughput value, and the first throughput value is greater than the second throughput value; and in response to the mismatch, providing the second response using the second communication channel.

7. The method of claim 4, further comprising:
in response to the mismatch, denying the third request without accessing the second resource.

8. The method of claim 4, further comprising:
determining a first time associated with the generating of the first identifier;
determining a second time associated with the receiving of the second request;
determining an interval of time based on the first time and the second time; and
determining that the interval of time is less than a threshold interval of time, wherein the first action is performed based in part on the interval of time being less than the threshold interval of time.

9. The method of claim 4, wherein determining the correspondence between the first identifier and the second identifier includes determining that the first identifier is stored in the data structure and determining that the second identifier matches the first identifier, and wherein the second action includes denying the third request.

10. The method of claim 4, wherein the first identifier includes a string within one or more of a Uniform Resource Identifier (URI), a header, or a query parameter associated with the second resource, and wherein the second request includes the one or more of the URI, the header, or the query parameter.

11. The method of claim 4, wherein the first identifier further includes a first characteristic associated with a schema and the second request includes a value for at least one field of the schema, the method further comprising:
determining a second characteristic of the schema, wherein the second characteristic is associated with the second request, and wherein the determining of the correspondence between the first identifier and the second identifier includes determining correspondence between the first characteristic of the schema and the second characteristic of the schema.

12. The method of claim 4, further comprising:
generating a first schema based on a second schema, wherein the first schema includes a first characteristic;
generating a user interface for receiving a value based on the first schema, wherein the second request includes the value and the first characteristic;
in response to the first characteristic of the second request matching the first characteristic of the first schema, determining the second schema based on the first schema; and
generating a second response based on the second schema.

13. A system comprising:
one or more memories storing computer-executable instructions; and
one or more hardware processors to execute the computer-executable instructions to:
determine a first schema based on a second schema;
receive a first request at a first application programming interface, wherein the first request is associated with the first schema;
determine a first identifier associated with a first resource, wherein the first identifier includes a first characteristic that is associated with the first schema;
store an indication of the first characteristic in a data structure;
send a first response;
receive a second request at a second application programming interface, wherein the second request includes the first characteristic;
determine correspondence between the first characteristic of the second request and the first characteristic of the first identifier;
in response to the second request, remove the indication of the first characteristic from the data structure;
determine a second response based on the second request;
receive a third request at the first application programming interface;
determine a third schema based on the second schema, wherein the third schema includes a second characteristic;
provide a third response that includes the second characteristic;
receive a fourth request that includes the first characteristic; and
in response to a mismatch between the data structure and the first characteristic of the fourth request, perform an action associated with the fourth request.

14. The system of claim 13, further comprising computer-executable instructions to:
in response to the correspondence, determine a fifth request based on the second request and the second schema; and
determine the second response based on the fifth request and the second schema.

15. The system of claim 13, further comprising computer-executable instructions to:
determine a third characteristic associated with the second request, wherein the correspondence further includes correspondence between the third characteristic of the second request and a third characteristic of the first identifier.

16. The system of claim 13, wherein the first response includes a user interface for receiving a value based on the first schema, and the second response is associated with the second schema.

17. The system of claim 13, further comprising computer-executable instructions to:
determine a first time associated with determination of the first identifier;
determine a second time associated with receipt of the second request; and
determine that an interval of time between the first time and the second time is less than a threshold interval of time, wherein the second response is further determined in response to the interval of time being less than the threshold interval of time.

18. The system of claim 13, further comprising computer-executable instructions to:
receive a fifth request at the second application programming interface;
determine that the fifth request lacks the first characteristic; and
deny the fifth request.

19. The system of claim 13, wherein the correspondence indicates a mismatch, the system further comprising computer-executable instructions to:
in response to the mismatch, provide the second response using a first communication channel having a first throughput value that is less than a second throughput value of a second communication channel.

20. The system of claim 1, further comprising computer-executable instructions to:
 store an indication of the first identifier in a data structure; and
 in response to the second request, remove the indication of the first identifier from the data structure;
 wherein the third request is denied in response to a mismatch between the data structure and the third request.

\* \* \* \* \*

UNITED STATES PATENT AND TRADEMARK OFFICE
CERTIFICATE OF CORRECTION

| | | |
|---|---|---|
| PATENT NO. | : 11,449,372 B1 | Page 1 of 1 |
| APPLICATION NO. | : 16/456572 | |
| DATED | : September 20, 2022 | |
| INVENTOR(S) | : Evan Alexander Chavis et al. | |

It is certified that error appears in the above-identified patent and that said Letters Patent is hereby corrected as shown below:

On the Title Page

Column 2, insert Missing References under "(56) References Cited":
--10,936,623 Mahalingam et al.
7,296,035 Polan et al.
2015/0225088 Andrejczyk et al.--

Signed and Sealed this
Eighth Day of November, 2022

Katherine Kelly Vidal
*Director of the United States Patent and Trademark Office*